(12) United States Patent
Kress et al.

(10) Patent No.: US 6,385,960 B1
(45) Date of Patent: May 14, 2002

(54) METHODS AND APPARATUS FOR OPERATION OF GAS TURBINES

(75) Inventors: Eric J. Kress, Loveland; Curtis L. Brown; Douglas M. Fortuna, both of Cincinnati, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/418,074

(22) Filed: Oct. 14, 1999

(51) Int. Cl.⁷ .............................. F02G 7/26; F02G 3/00
(52) U.S. Cl. ..................................... 60/39.06
(58) Field of Search .................. 60/39.141, 39.142, 60/39.58, 39.59, 39.53, 746, 39.463, 39.06

(56) References Cited

U.S. PATENT DOCUMENTS

| | | | |
|---|---|---|---|
| 4,603,548 A | * 8/1986 | Ishibashi et al. | 60/39.06 |
| 4,716,719 A | * 1/1988 | Takahashi et al. | 60/39.06 |
| 4,833,878 A | * 5/1989 | Sodd et al. | 60/39.06 |
| 4,897,994 A | * 2/1990 | Shekleton | 60/39.06 |
| 5,561,976 A | * 10/1996 | Chu et al. | 60/39.463 |
| 5,806,299 A | * 9/1998 | Bauermeister et al. | 60/39.06 |
| 6,079,198 A | * 6/2000 | Prowse et al. | 60/39.06 |
| 6,092,364 A | * 7/2000 | Stellwagen | 60/39.463 |

* cited by examiner

Primary Examiner—Charles G. Freay
Assistant Examiner—William H Rodriguez
(74) Attorney, Agent, or Firm—William Scott Andes; Armstrong Teasdale LLP

(57) ABSTRACT

An operating system includes a fuel and control sub-system which includes a main gas circuit, a start gas circuit, a dual fuel nozzle, and a plurality of metering valves. The fuel and control sub-system is configured to transition the operation of the engine from operating with a start gas having a high heating value to using a main gas having a low heating value. The sub-system is further configured to inject water into the gas turbine and permits a user to adjust an overall fuel heating value to improve flammability limits and avoid regions of combustor acoustics.

20 Claims, 3 Drawing Sheets

METHODS AND APPARATUS FOR OPERATION OF GAS TURBINES

BACKGROUND OF THE INVENTION

This invention relates generally to gas turbine engines and, more particularly, to fuel and control sub-systems for operating gas turbine engines with low heating value gaseous fuels.

Operating a gas turbine engine with a gaseous fuel which has a low heating value can adversely impact the fuel system due to poor ignition characteristics of low heating value fuels, a large volume of gas needed to sustain combustion, and a reduced flameout margin. To overcome the poor ignition characteristics, typically an alternate fuel is used for gas turbine engine start-up conditions.

To maintain acceptable fuel supply pressures with the large volume of gas needed to sustain combustion, the gas turbine engine includes a fuel nozzle discharge area that is significantly larger than a fuel nozzle discharge area for other fuel types. However, the increased size of the fuel nozzle discharge area provides a very low fuel nozzle discharge area pressure ratio during gas turbine engine start-up conditions using the alternate fuel which may lead to combustion instability and/or engine flameouts. Furthermore, rapid transient operations of the gas turbine engine, such as load drops, may result in additional engine flameouts due to a reduced flameout margin intrinsic with the low heating value fuel.

BRIEF SUMMARY OF THE INVENTION

In an exemplary embodiment, a fuel and control sub-system is provided for operating a gas turbine engine with fuels having a low heating value. The fuel and control sub-system includes two separate metered gas fuel circuits and a dual gas nozzle. A main gas circuit is configured to deliver a fuel having a low heating value and a start gas circuit is configured to deliver at a start fuel having a high heating value to sustain the gas turbine engine during start-up and idle engine operation. The sub-system further includes a plurality of metering valves to transition the operation of the engine from operating with the start gas having a high heating value to operating with a main gas having a low heating value.

During operation, the control sub-system delivers the start gas, the main gas, or a mixture of start gas and main gas to the gas turbine engine. The sub-system also injects water into a combustor of the engine to decrease engine emissions. As a result, the control sub-system permits the user to adjust the fuel mixture to improve flammability limits and avoid regions of engine combustor instability. As a result, the control sub-system provides a user with flexibility to accurately control the delivery of fuel to a gas turbine engine.

DETAILED DESCRIPTION OF THE INVENTION

Figure 1:
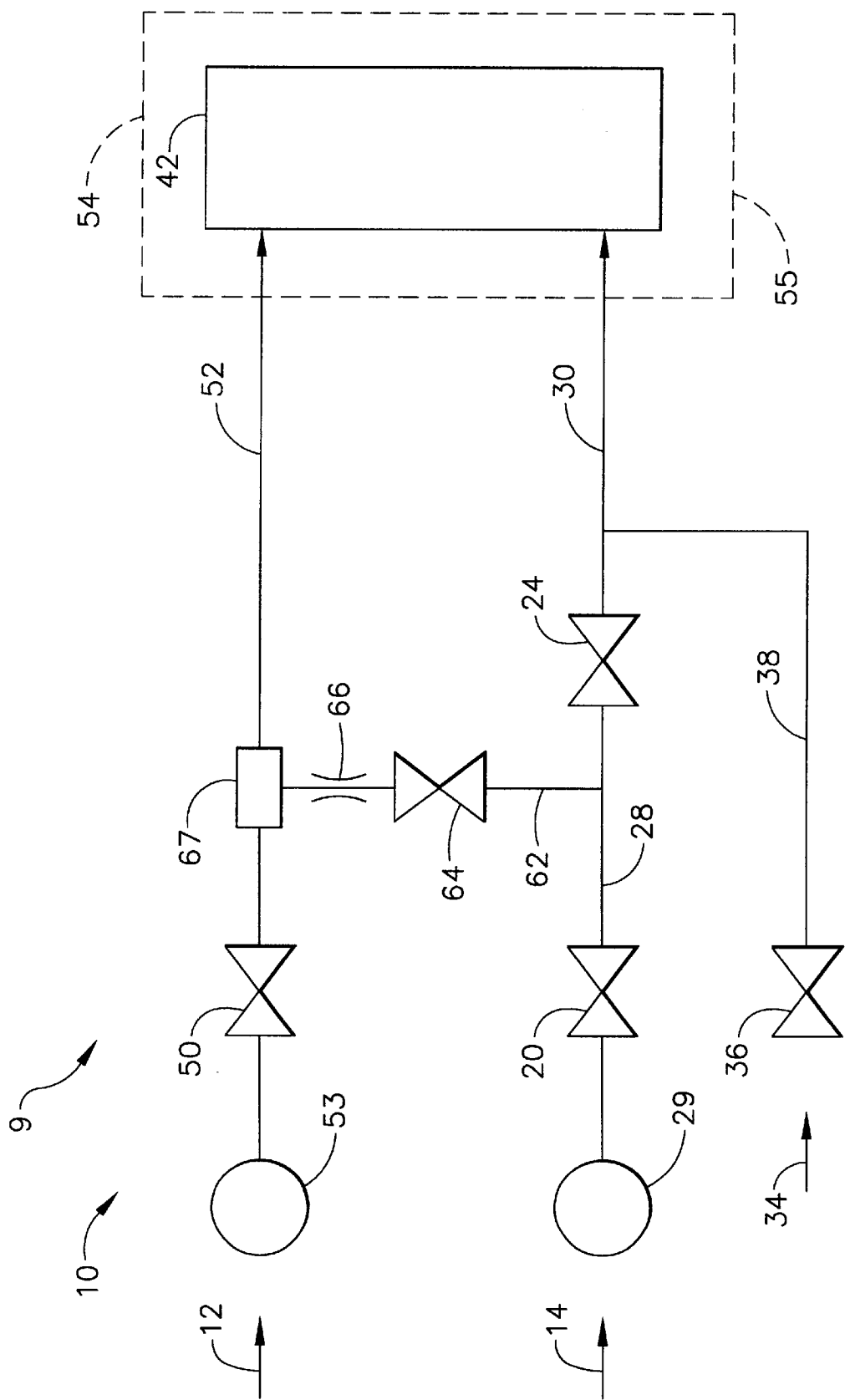
FIG. 1 is a schematic illustration of an operating system including a fuel and control sub-system for gas turbine operation with low heating value fuels.

FIG. 1 is a schematic illustration of an operating system 9 including a fuel and control sub-system 10 for operating a gas turbine engine (not shown) with low heating value fuels (not shown). The term low heating value fuels, as used herein, refers to fuels having heating values in a range between about 450 and 650 BTU/scf. Sub-system 10 includes a main gas circuit 12 and a start gas circuit 14. Main gas circuit 12 and start gas circuit 14 are both metered and sized to achieve a fuel nozzle discharge area pressure ratio (not shown) that is appropriate for the fuel being delivered to the gas turbine engine.

Start gas circuit 14 delivers a start gas fuel (not shown) for use in starting the gas turbine engine. Start gas circuit 14 includes a first block valve 20, a second block valve 24. Second block valve 24 is connected to first block valve 20 with a connecting line 28. First block valve 20 is also connected to a supply line (not shown) which extends from a start gas supply source (not shown). A metering valve 29 is connected to the start gas supply source and controls a flow of fuel from the start gas supply source to start gas circuit 14. Metering valve 29 is positioned between the start gas supply source and block valve 20. The operation of a metering valve for controlling a flow of a gas is well known. In one embodiment, metering valve 29 is an electric actuated model EM35 available from Woodward Govenor Co., Loveland, Colo. A second connecting line 30 is attached second block valve 24 and extends to the gas turbine engine.

A third circuit 34 is connected to start gas circuit 14 and permits the injection of water (not shown) when start gas circuit 14 is not in use and start gas fuel is not being supplied to the gas turbine. Third circuit 34 includes a block valve 36 connected to a supply line (not shown) which leads from a water supply source (not shown), and a connecting line 38 connected between block valve 36 and connecting line 30.

Main gas circuit 12 delivers a low heating value gas fuel (not shown) for use in operating the gas turbine. Main gas circuit 12 includes a first block valve 50 and a connecting line 52 which leads from block valve 50 to nozzle 42. Block valve 50 is also connected to a supply line (not shown) which is connected to a main gas supply source (not shown). A metering valve 53 is connected to the main gas supply source and controls a flow of fuel from the main gas supply source to main gas circuit 12. Metering valve 53 is positioned between the main gas supply source and block valve 50. In one embodiment, metering valve 53 is an electric actuated model EM35 available from Woodward Govenor Co., Loveland, Colo.

A manifold 54 is connected to main gas circuit 12 and a second manifold 55 is connected to start gas circuit 14. Each manifold 54 and 55 includes a plurality of nozzles 42. Main gas circuit 12 is connected to manifold 54 with connecting line 52 which leads from block valve 50 and start gas circuit 14 is connected to manifold 54 with connecting line 30 which extends from second block valve 24. Start gas circuit 14 is connected to manifold 55 with connecting line 30. In one embodiment, manifolds 54 and 55 include thirty nozzles 42.

A purge line 62 is connected between main gas circuit 12 and start gas circuit 14 and extends from start gas circuit connecting line 28 to main gas circuit connecting line 52. Purge line 62 includes a block valve 64 used to isolate main gas circuit 12 from start gas circuit 14. Purge line 62 is connected to main gas circuit connecting line 52 upstream from fuel nozzle 42. An orifice 66 is connected to purge line 62 between connecting line 52 and block valve 64 and limits the amount of main gas flowing into start gas circuit 14. Purge line 62 can be used to mix the start gas and the main gas at gas circuit interface 67.

In operation, initially block valves 20 and 24 are opened and the gas turbine engine is started with the start gas through start gas circuit 14. In one embodiment, the start gas is natural gas. In an alternative embodiment, the gas turbine engine is started with a liquid start fuel. Low heating value fuels have poor ignition capabilities. Therefore, a start gas fuel with a heating value greater than 700 BTU/scf is supplied to start circuit 14 when starting the gas turbine and when operating the gas turbine at idle speeds.

Once the gas turbine engine obtains a core idle speed, block valve 50 is opened. Opening block valve 50 permits main gas circuit 12 to be purged with a minimum gas flow of an operating gas (not shown) while the gas turbine remains operating with the start gas supplied through start gas circuit 14. As the gas turbine engine is accelerated to a synchronous idle speed, fuel and control sub-system 10 transitions from supplying the gas turbine with fuel from start gas circuit 14 to supplying the gas turbine with fuel from main gas circuit 12.

Transitioning from supplying fuel through start gas circuit 14 to operating with main gas circuit 12 is accomplished by steadily closing start gas circuit metering valve 29 from a fully open valve position (not shown) to a fully closed valve position (not shown) and simultaneously steadily opening main gas circuit metering valve 53 from a fully closed valve position (not shown) to a fully open valve position (not shown). In one embodiment, fuel and control sub-system 10 is automatically controlled by a processor (not shown). Accordingly, a fuel transition occurs, fuel and control sub-system 10 switches from delivering a start gas to the gas turbine to delivering a main gas to the gas turbine engine. To complete the fuel transition, block valve 20 is closed and block valve 64 is opened to purge start gas circuit 14 with the main gas. In one embodiment, the transition, discussed in more detail below, can occur up to 5 MW of gas turbine engine power.

Purge line 62 permits start gas circuit 14 to be purged with the main gas which prevents hot combustion gas ingestion and recirculation when start gas circuit 14 is not in use. Purge line 62 also permits the mixture of the start gas and the main gas at main gas circuit interface 67. Such a mixture permits the fuel and control sub-system to supply a higher proportion of start gas to the gas turbine which may increase a flammability limit of an ultra low heating value main gas (not shown). In one embodiment, the ultra low heating value main gas has a heating value of less than 450 BTU/scf.

The gas turbine is then accelerated to full power and is operated using main gas supplied from main gas circuit 12. By controlling the valve positions of main gas circuit metering valve 53 and start gas circuit metering valve 29, fuel and control sub-system 10 is capable of supplying the start gas, the main gas, or any mixture of the start gas and the main gas to the gas turbine. In operating regions that are prone to operability limitations including combustor acoustics and flameouts, the valve positions of main gas circuit metering valve 53 and start gas circuit metering valve 29 may be adjusted to permit dual gas operation of the gas turbine engine. Positioning main gas circuit metering valve 53 and start gas circuit metering valve 29 in intermediate positions between fully open and fully closed positions a user to adjust the ratio of the main gas to the start gas, thus adjusting the overall heating value of the fuel supplied to the gas turbine engine. Additionally, the main gas circuit pressure may be adjusted in a similar manner to eliminate any combustor acoustics, which develop.

Furthermore, emissions may develop which exceed the user's site limitations. Additionally, injecting water into a combustor during the gas turbine engine's full power operation with low heating value fuel will reduce $NO_x$ emissions. To inject water with fuel and control sub-system 10, purge valve 64 and block valve 24 are both closed and block valve 36 is opened.

Figure 2:
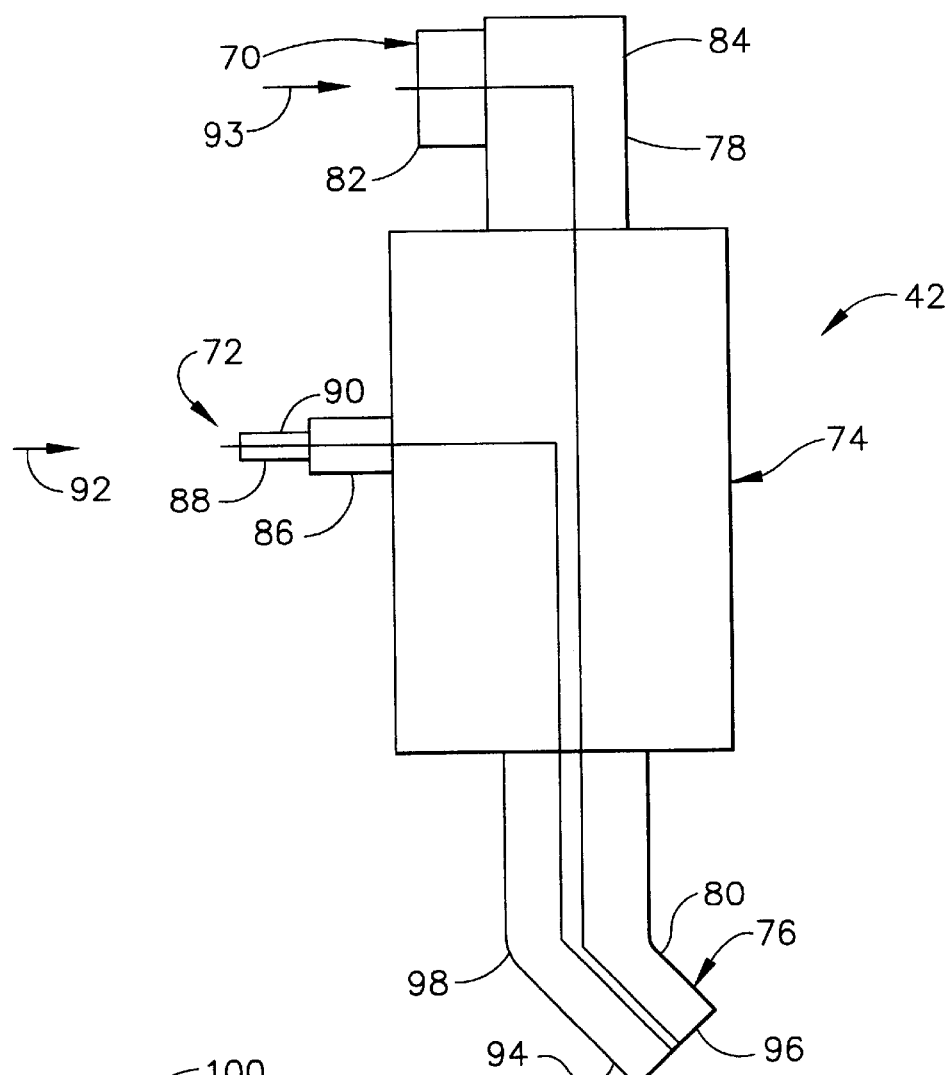
FIG. 2 is a side schematical view of a dual fuel nozzle for use in the fuel and control sub-system shown in FIG. 1.

FIG. 2 is a side schematical view of one embodiment of a dual fuel nozzle 42 that could be used in conjunction with fuel and control sub-system 10 (shown in FIG. 1). Nozzle 42 includes a main gas inlet 70, a start gas/water inlet 72, a nozzle body 74, and a nozzle tip 76. Nozzle body 74 has a first end 78 and a second end 80. Main gas inlet 70 is positioned adjacent first end 78 and nozzle tip 76 is positioned adjacent second end 80.

Main gas inlet 70 extends from nozzle body 74 and includes a coupling 82 which permits a connection to fuel and control sub-system main gas circuit connecting line 52 (shown in FIG. 1). Additionally, main gas inlet 70 includes an elbow 84 which connects coupling 82 to nozzle body 74. As gas flows through connecting line 52 into coupling 82, elbow 84 directs the gas flow from coupling 82 towards nozzle body 74.

Start gas/water inlet 72 extends from a shoulder 86 which is an extension of nozzle body 74. Start gas/water inlet 72 includes a coupling 88 which connects nozzle 42 to fuel and control sub-system start gas circuit connecting line 30. Coupling 88 is also attached to a tube 90 which connects coupling 88 to nozzle shoulder 86. Start gas and/or water enter start gas/water inlet 72 in a direction 92 which is substantially parallel to a direction 93 in which main gas enters main gas inlet 70. Once within nozzle shoulder 86, start gas and water are directed towards nozzle tip 76.

Nozzle tip 76 includes a nozzle tip body 94 and an outlet tip 96. Nozzle tip body 94 has a circular cross-sectional profile. An elbow 98 is disposed within nozzle body 74 to redirect the gas flow from nozzle body 74 towards nozzle tip 76. Outlet tip 96 extends away from nozzle tip body.

Figure 3:
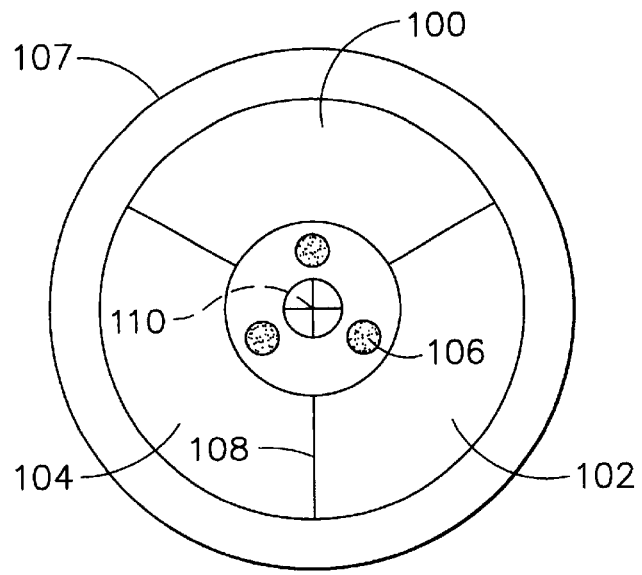
FIG. 3 is a front view of a nozzle tip for use with the dual fuel nozzle shown in FIG. 2.

FIG. 3 is a front view of nozzle tip 76 including three openings 100, 102 and 104, and a plurality of apertures 106. Nozzle tip 76 has a circular cross-sectional profile 107 and an outer surface 108 which extends from a center 110 towards nozzle tip body 94. Openings 100, 102, and 104 are positioned around apertures 106 and are disposed on outer surface 108. Apertures 106 are disposed circumferentially around center 110. Openings 100, 102, and 104 are connected to main gas inlet 70 (shown in FIG. 2) and apertures 106 are connected to start gas/water inlet 72 (shown in FIG. 2).

Openings 100, 102, and 104 are main gas outlets and are larger than apertures 106 which are start gas outlets. The reduced size of apertures 106 increases the pressure of the start gas fuel as it flows through nozzle body 74 and exits nozzle tip 76. Accordingly, the increased pressure permits the gas turbine engine (not shown) to initially operate on start gas while reducing the possibility of engine flame out due to low pressure ratios across nozzle apertures 106 at lower fuel flow rates.

Figure 4:
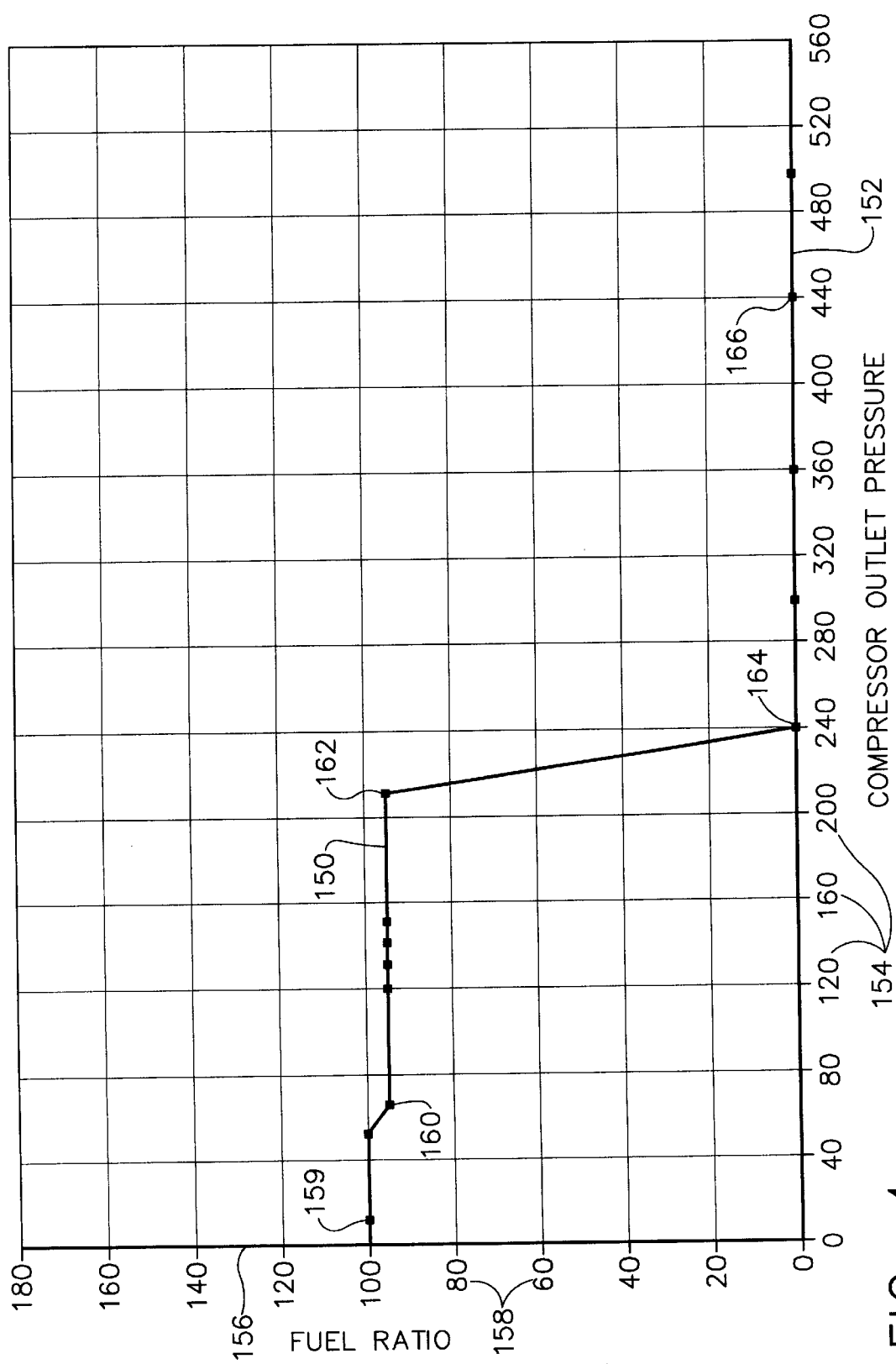
FIG. 4 is a transition schedule curve for a gas turbine engine using the operating system shown in FIG. 1.

FIG. 4 is a transition schedule curve 150 for a gas turbine engine (not shown) using operating system 9 including fuel and control sub-system 10. A horizontal axis 152 represents compressor outlet pressure 154 at station 3, i.e. PS3, in terms of PSIA. A vertical axis 156 represents a fuel ratio 158 between the start gas and the main gas.

The gas turbine engine is initially started using only start gas. As compressor outlet pressure 154 increases, operating system 9 transitions from supplying fuel through start gas circuit 14 to operating with main gas circuit 12. In one embodiment, when the compressor outlet pressure 154 has increased to approximately 50 psia, fuel and control sub-system 10 switches from delivering only start gas to the gas turbine and begins delivering a ratio 158 of start gas and main gas to the gas turbine engine until the gas turbine engine obtains compressor outlet pressure 154 to support a gas turbine engine core idle operating speed 160.

Operating system 9 continues to deliver ratio 158 of start gas and main gas to the gas turbine engine until compressor outlet pressure 154 has increased to support a gas turbine engine synchronous idle operating speed 162. In one embodiment, compressor outlet pressure 154 increases to approximately 215 psia to support gas turbine engine synchronous idle operating speed 162. After the gas turbine is operating at synchronous idle operating speed 162, fuel and control sub-system 10 adjusts fuel ratio 158 to complete the fuel transition from start gas to operating with a compressor outlet pressure 164 which supports the gas turbine engine using main gas. In one embodiment, compressor outlet pressure 164 is approximately 240 psia to support the gas turbine engine operating using only main gas. Compressor outlet pressure 154 is increased until the gas turbine engine obtains maximum power at a compressor outlet pressure 166. In one embodiment, compressor outlet pressure 166 is approximately 440 psia.

The above-described fuel and control sub-system for operating a gas turbine engine with low heating value fuels is cost-effective and highly reliable. The sub-system includes two separate metered gas fuel circuits and a dual gas nozzle. A main gas circuit delivers a fuel having a low heating value BTU and a start gas circuit delivers a start fuel at a pressure and a heating value sufficient to sustain a gas turbine engine during a start-up sequence and during idle engine operation. The sub-system further includes a plurality of metering valves that transition the operation of the engine from utilizing a start gas having a high heating value to the use of a main gas having a low heating value. As a result, a fuel and control sub-system is provided which permits the user to adjust the fuel mixture to improve flammability limits and avoid regions of engine combustor instability. Additionally, the fuel and control sub-system provides a user with enough flexibility to accurately control the delivery of fuel to a gas turbine engine.

While the invention has been described in terms of various specific embodiments, those skilled in the art will recognize that the invention can be practiced with modification within the spirit and scope of the claims.

What is claimed is:

1. A method for delivering fuel through an operating system to a gas turbine engine, the operating system including a fuel sub-system including a main gas circuit and a start gas circuit, the fuel sub-system configured to deliver a first fuel and a second fuel to the gas turbine, and a control sub-system including a plurality of metering valves, the control sub-system for controlling the fuel sub-system, said method comprising the steps of:
   supplying a fuel through a block valve to the main gas circuit and through a block valve to the start gas circuit;
   using the control sub-system to direct the fuel from the fuel sub-system to the gas turbine engine through a plurality of metering valves; and
   using the control sub-system to direct fuel from the main gas circuit through a purge line including a block valve to the start gas circuit to prevent hot combustion gas ingestion between the main and start gas circuits.

2. A method in accordance with claim 1 wherein the fuel sub-system includes a fuel nozzle including a first inlet and a second inlet, said step of directing the gas comprises the step of directing the first fuel to the second inlet.

3. A method in accordance with claim 2 wherein the first inlet is connected to the main gas circuit, the second inlet is connected to the start gas circuit, and the plurality of metering valves includes a start circuit metering valve and a gas metering valve, said step of directing the gas from the fuel sub-system to the gas turbine further comprises the step of transitioning from the second inlet to the first inlet by closing the start metering valve and simultaneously opening the main gas metering valve.

4. A method in accordance with claim 3 further comprising the step of supplying the second fuel to the start gas circuit through the purge line to prevent hot combustion gas ingestion and recirculation when the start circuit is not in use.

5. A method in accordance with claim 3 wherein the main gas circuit includes a main gas circuit pressure ratio, said method further comprising the step of adjusting the main gas circuit pressure ratio to eliminate combustor acoustics and prevent engine flameouts by simultaneously adjusting the the main gas metering valve and the start gas metering valve.

6. A method in accordance with claim 3 wherein the control sub-system further includes an interface connected to the main gas circuit and the start gas circuit, said method further comprises the step of supplying a mixture of the start gas and the main gas to operate the gas turbine engine.

7. An operating system for a gas turbine engine comprising:
   a fuel sub-system comprising a main gas circuit and a start gas circuit, said fuel sub-system configured to deliver to the gas turbine a first fuel and a second fuel; and
   a control sub-system configured to control said fuel sub-system for preventing hot combustion gas ingestion within said fuel sub-system, said control sub-system comprising a plurality of metering valves and a purge line connected between said main gas circuit and said start gas circuit, said purge line comprising at least one block valve, said main gas circuit comprising a block valve upstream from said purge line, said start gas circuit comprising a block valve upstream from said purge line.

8. An operating system in accordance with claim 7 wherein said fuel sub-system further comprises a fuel nozzle, said start gas circuit configured to supply water to the gas turbine engine.

9. An operating system in accordance with claim 7 wherein said plurality of metering valves comprises a start circuit metering valve and a gas metering valve.

10. An operating system in accordance with claim 8 wherein said fuel nozzle comprises a first inlet and a second inlet, said second inlet configured to receive said first fuel and said first inlet configured to receive said second fuel.

11. An operating system in accordance with claim 10 wherein said first inlet is connected to said main gas circuit and said second inlet is connected to said start gas circuit.

12. An operating system in accordance with claim 11 wherein said nozzle further comprises a nozzle tip connected to said first inlet and said second inlet.

13. An operating system in accordance with claim 12 wherein said nozzle tip comprises a main gas outlet and a start gas outlet, said main gas outlet comprises a plurality of openings, said start gas outlet comprises a plurality of apertures.

14. An operating system in accordance with claim 13 wherein said main gas outlet openings are positioned around said start gas outlet apertures.

15. An operating system in accordance with claim 9 wherein said control sub-system purge line further comprises an orifice configured to control flow of fuel from said main gas circuit to said start gas circuit.

16. An apparatus for delivering fuel to an operating system for a gas turbine engine, said apparatus comprising:

a fuel and control sub-system comprising at least two metered gas fuel circuits, a fuel nozzle, and a plurality of metering valves connecting said fuel nozzle to said fuel circuits, said fuel and control sub-system configured to supply a plurality of fuels to the gas turbine engine; and a purge line connected between said two metered gas fuel circuits for preventing recirculation between said two metered gas fuel circuits, said purge line comprising a block valve, each said metered gas fuel circuit comprising at least one block valve upstream from said purge line.

17. An apparatus in accordance with claim 16 wherein said two metered gas fuel circuits comprise a main gas circuit and a start gas circuit, said metering valves comprise a main gas metering valve and a start gas metering valve.

18. An apparatus in accordance with claim 17 wherein said fuel nozzle comprises a nozzle tip connected to a first inlet and a second inlet, said first inlet connected to said main gas circuit, said second inlet connected to said start gas circuit.

19. An apparatus in accordance with claim 18 wherein said nozzle tip comprises a main gas outlet and a start gas outlet, said main gas outlet connected to said first inlet, said start gas outlet connected to said second inlet.

20. An apparatus in accordance with claim 19 wherein said main gas outlet comprises a plurality of openings, said start gas outlet comprises a plurality of apertures, said main gas outlet openings disposed around said apertures.

\* \* \* \* \*